United States Patent [19]

Loftus

[11] Patent Number: 5,732,539

[45] Date of Patent: Mar. 31, 1998

[54] RETROFIT CHAIN SICKLE CUTTER

[76] Inventor: Thomas E. Loftus, 224 County Rd. Ø. E., Ivesdale, Ill. 61851

[21] Appl. No.: 641,505

[22] Filed: May 1, 1996

[51] Int. Cl.⁶ .................................................. A01D 34/83
[52] U.S. Cl. ............................. 56/291; 56/244; 56/292
[58] Field of Search ........................ 56/13.9, 12.8, 56/13.3, 13.4, 244, 245, 290, 291, 292; 30/274

[56] References Cited

U.S. PATENT DOCUMENTS

| | | | |
|---|---|---|---|
| 536,464 | 3/1895 | Friesz | 56/289 |
| 673,424 | 5/1901 | Denton | 56/292 |
| 682,875 | 9/1901 | Love | 56/291 |
| 779,994 | 1/1905 | Downing | 56/291 |
| 1,580,668 | 4/1926 | Morgan | 56/289 |
| 1,851,840 | 3/1932 | Huff | 56/292 |
| 2,199,642 | 5/1940 | Maninger | 56/292 |
| 2,793,487 | 3/1957 | Wobermin | 56/290 |
| 2,821,060 | 1/1958 | Shoffner | 56/292 |
| 3,006,129 | 10/1961 | Sayre | 56/292 |
| 3,029,584 | 4/1962 | Johnson | 56/291 |
| 3,034,276 | 5/1962 | Hester | 56/291 |
| 3,681,901 | 8/1972 | Buchele et al. | 56/291 X |
| 4,070,810 | 1/1978 | Brakke | 56/291 |
| 4,622,804 | 11/1986 | Krone | 56/291 |
| 4,656,819 | 4/1987 | Pearson | 56/291 |

*Primary Examiner*—Terry Lee Melius
*Assistant Examiner*—Robert Pezzuto
*Attorney, Agent, or Firm*—Roger M. Fitz-Gerald

[57] ABSTRACT

A cutting and mowing apparatus comprising a continuous sickle chain assembly (8) utilizing cutting knives (10). The sickle chain assembly is confined within channel (29) formed by stationary guards (28) by means of alternating chain members (12), knives (10), and links (14). The sickle chain assembly is motivated by drive assemblies (31), which possess an integral protective slip clutch assembly (45). The sickle chain assemblies tightness is maintained using spring loaded tensioner assemblies (89). On the rearward return path, the sickle chain assembly slides in the return channel (144). The drive assemblies (31) are powered from the hydraulic system of the parent machine, such as a combine, tractor, or mower/conditioner. This unit, while being designed to retrofit existing cutting machines, can also be used for new production models.

11 Claims, 4 Drawing Sheets

RETROFIT CHAIN SICKLE CUTTER

BACKGROUND—FIELD OF INVENTION

This invention relates generally to a cutting and mowing apparatus. In particular, this invention relates to an apparatus for translating a continuous chain of cutting blades around the perimeter of an elongated frame member comprising of a front solid frame, and a rear return channel. The apparatus will be powered by the existing hydraulic system of the combine, tractor, forage harvester, or other parent power unit to which it is attached.

BACKGROUND—DESCRIPTION OF PRIOR ART

Conventional cutting and mowing apparatus typically utilize a plurality of knife edged blades mounted on a reciprocating metal bar in conjunction with stationary guards located at 7.5 cm. longitudinal centers. The disadvantages of reciprocating blade technology are well known. For instance, this type of cutter causes immense vibration on the machine to which it is attached, due to the fact that it must come to a complete stop at the end of each stroke.

Another disadvantage is that the reciprocating blade speed is not adjustable, whereas it is running at the maximum speed at all times promoting wear and stress on the unit. Modern harvesters must be kept full of crop material to do an efficient job of separation.

With todays large capacity harvesters, the reciprocating apparatus cannot cut the material fast enough to keep these harvesters full. Numerous devices have been utilized to avoid, or at least minimize the disadvantages of the reciprocating cutting device. For example, U.S. Pat. No. 536,464, issued to Friesz, discloses a rotary cutting device. In it individual wheels with cutting blades attached to them B, are mounted on a chain comprised of curved links 19 which traverses along a plate or bar 12. This particular system has far too many moving parts, making it very heavy, expensive to manufacture, and would require much maintenance.

U.S. Pat. No. 673,424, issued to Denton, discloses a cutting mechanism utilizing a continuous chain. A conventional chain 52 is used to engage sprocket wheels 31, while cutting blades 53 are periodically fastened to the chain. A requirement of this system is the preservation of a considerable space between successive blades in order to accomplish the desired rotation and engagement functions as the blades pass over the sprocket wheel, requiring higher speeds to accomplish satisfactory cutting. Also the stationary guards 61 would be heavy, and very expensive to manufacture.

U.S. Pat. No. 682,875, issued to Love, discloses a mowing or reaping machine. Succeeding blades Q are attached to a chain O which has inward protrusions o' which engage a sprocket P'. Again, a considerable space must be left between the succeeding blades to allow for proper travel of the chain around the sprocket.

U.S. Pat. No. 779,994, issued to Downing, discloses a cutting apparatus for mowers and reapers. An endless chain G is used to engage sprocket wheels F, while cutting blades g are periodically fastened to the chain. The shape of the cutting blades g of this design, permit it to run in one direction only.

U.S. Pat. No. 1,580,668, issued to Morgan, discloses a reaping machine. Morgan discloses a chain a 33 upon which are mounted a plurality of knives 22 and grain propelling members 36. This design also is uni-directional, requires an extensive manufacture of special parts, and lacks the use of stationary guards which are essential for small grain harvesting or mowing when using sectioned cutting knives.

U.S. Pat. No. 2,793,487, issued to Woberman, discloses a chain sickle mower. In this design, sickle knives 78 are affixed on a roller chain 51 by utilizing small pins 100 with washers 102 and cotter pins 104 to secure the knives to the chain. This design utilizes a frame to which all operating elements are attached to form an integral sickle unit. Due to the integral design, this unit would not be easily adaptable to existing harvesting platforms or mower/conditioner units. Also, utilizing pins and cotter keys 3to attach knife sections, would result in excessive tolerances within the chain accelerating wear, and would promote chain separation from loss of the pins due to the wearing action of the crop against the cotter pins.

U.S. Pat. No. 2,821,060, issued to Shoffner, discloses an endless cutting assembly. As with Wobermans design above, this design also incorporates the use of cotter fasteners for the knife sections, and the integral design of the unit. This unit also incorporates the use of an upper housing 102 which would necessitate removal of numerous cap screws 122 to perform replacement of broken knife sections or servicing of the chain.

U.S. Pat. No. 3,006,129, issued to Sayre, discloses an endless mower. The cutting assembly consists of an endless chain 12 carrying a plurality of cutting knives 13. In this design considerable space is required between knives, requiring higher speeds to accomplish satisfactory cutting.

U.S. Pat. No. 3,029,584, issued to Johnson, discloses an endless cutting assembly. A chain is formed by alternating links 38 with blades 39, the links being engaged by small protrusions 33 on a conventional sprocket wheel 29. In this assembly, the chain design again necessitates considerable space between successive blades. This design also uses rivets, or the chain pivot pins to secure the knife sections, making replacement of dull or broken knives difficult.

U.S. Pat. No. 3,034,276, issued to Hester discloses an endless cutting assembly. In this design , the chain-blade assembly includes the chain FIG. 7, with blade members 89 affixed to the chain by rivets 100. The design of the blades 89 is such that the cutting mechanism could only be run in one direction. This design also uses rivets 100 to secure the blade members to the chain and supporting angle arm 91, making replacement of the blade members difficult.

U.S. Pat. No. 3,681,901, issued to Quick & Buchele, discloses a cutting knife assembly for a combine. This assembly combines two rotary chains 24 and 26 travelling in opposite directions. The cutting knife assembly causes the bottom of stems of plants being cut to be displaced in the same direction as the knife travel so that after severance, the stem is inclined toward the center of the header or in the same direction as the auger feed. The limitations to this unit are that the cutting knives have only one sharp angulated edge.

It also incorporates a center divider 58 necessary to guide the crop to either cutting chain,causing the material being impacted by it to be bent over or crushed on the ground. This design obviously is not reversible.

U.S. Pat. No. 4,070,810, issued to Brakke, discloses a cutting apparatus. The cutting assembly consists of an endless chain carrying a plurality of cutting knives. In this design, the knife blades 63 are secured to the chain by pins 61 using small snap rings 62. It is apparent that the continuous accumulation of dust and fines of the material being cut, would become inbedded in the chain housing 38 dislodging the snap rings possibly causing the chain to become separated, or allowing for separation of the knives from the chain.

U.S. Pat. No. 4,622,804, issued to Krone et al., discloses a machine which is pulled or provided with a three point attachment to a tractor and used for the harvesting of corn and similar stalk-like crop. This assembly consists of two separate chains 10 & 11 rotating on the same plane in a countercurrent direction, severing the crop, then conveying it to an integral chopping mechanism FIG. 10. This apparatus is designed for large stalk crops such as corn, and would not be suitable for small grains or grass cutting due to the excessive weight and lack of periodically spaced stationary guards to complete the severance operation.

U.S. Pat. No. 4,656,819, issued to Pearson, discloses a chain sickle. This design is comprised of a continuous chain 13-14-15 which causes a plurality of blades 12, which are affixed to the chain by rivets or other shafted fasteners 22, to continuously translate around an elongated frame member 5. In this design, cutting knives are fastened to small planar segments 14 which comprise the top link of the chain, and the mechanism of drive for the chain, which engages the drive sprocket 28.

This design, while providing positive engagement, places metal to metal contact on a very narrow segment of the drive sprocket which could cause sprocket failure or chain slippage very rapidly, due to the thin finger design of the sprocket, and the very thin cross section of the chain segments.

Each of the devices of prior art, while sometimes satisfactory for their intended purposes, leaves much to be desired in that they are relatively complex in design, costly, cumbersome to use, and somewhat inefficient. In particular, the method of attaching the knives to the endless chain and providing for a light weight, simple, and mechanically sound method of transporting the knives through thousands of revolutions without failure, has only been touched on by the prior art devices. Eliminating the need for constant cutter chain adjustment, has not been addressed in the prior art with a viable tensioning device.

None of the prior art disclosed was designed to be applied to existing cutting or harvesting machines currently being used. If they were to be used, it would require extensive alteration to these machines.

None of the devices disclosed have been commercially exploited or produced in quantity for use by the public.

OJECTS AND ADVANTAGES

The subject invention overcomes many of the disadvantages of the prior art, including those mentioned above, in that it comprises a relatively simple chain sickle cutting device, several objects and advantages of the present invention are:

(a) to provide a chain sickle cutting device which will utilize the existing hydraulic system of a combine or other power unit allowing the operator to reverse direction, or change speed on demand, or to connect it to an automatic chain speed/ground speed ratio hydraulic circuit;

(b) to provide a chain sickle cutting device utilizing a continuous chain which causes knives, which are an integral part of the chain, to continuously translate around an elongated frame member;

(c) to provide a chain sickle cutting device in which the knives perform their cutting action throughout the entire length of travel along the front side of the frame member;

(d) to provide a chain sickle cutting device which may be constructed of readily available materials, many of which are already affixed to the existing reciprocating unit, and are readily available for new production units, substantially reducing the cost;

(e) to provide a chain sickle cutting device with a unique knife design which allows the unit to function without gaps between knives, and which allows easy replacement of the knives;

(f) to provide a chain sickle cutting device in which the knife forms the top link of the chain assembly, providing for a lightweight, compact, unit which will fit into existing reciprocating knife units with only minor if any alteration, yet retaining strength;

(g) to provide a chain sickle cutting device with drive units which protect the chain assembly from damaging obstructions by incorporating spring loaded slip clutches, and damage from wear by utilizing a hard rubber in the drive pulleys;

(h) to provide a chain sickle cutting device with a lightweight enclosed return channel for safety, lined with an antifriction material minimizing chain wear;

(i) to provide a chain sickle cutting device utilizing spring loaded chain tensioner units, maintaining proper chain tightness, and eliminating frequent adjustment;

Further objects and advantages are to provide a chain sickle cutting device which is lightweight yet durable, and which may be utilized for both new production grain harvesting or mowing machines, as well as for retrofitting older or currently used machines economically. Still further objects and advantages will become apparent from a consideration of the ensuing description and drawings.

DRAWING FIGURES

Figure 1:
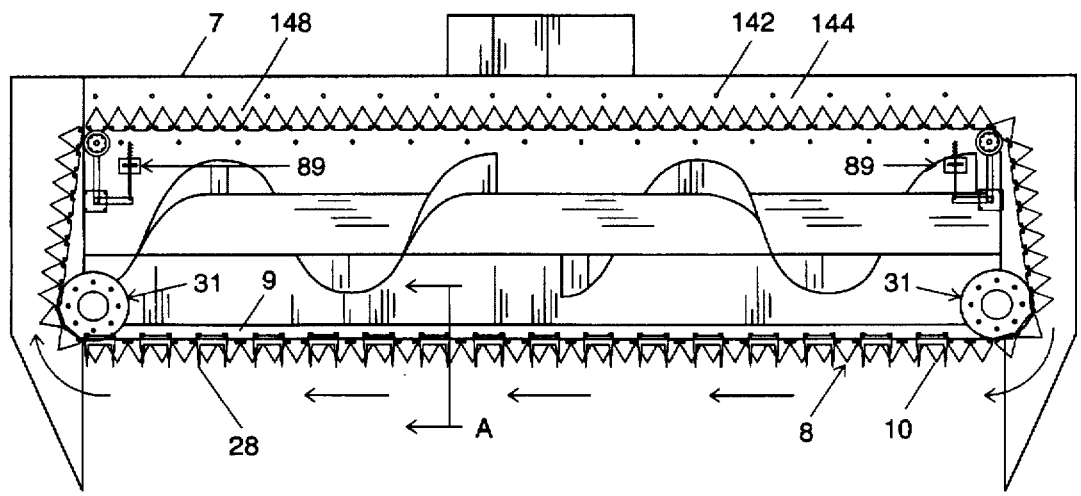
FIG. 1 is a pictorial view showing the retrofit chain sickle cutter according to the present invention when in use with a combine grain platform.

| Reference Numerals in Drawings | |
|---|---|
| PART NAME | PART NAME |
| 7 Elongated platform | 72 Upper drive disk |
| 8 Sickle chain assy. | 74 Sprocket |
| 9 Main cutter support | 76 Lower drive disk |
| 10 Knife | 78 Lower guide plate |
| 12 Chain member | 80 Pressure plate |
| 14 Link | 82 Clutch bolt |
| 15 Slot | 84 nut |
| 16 Chain Bearing-inner | 86 Clutch spring |
| 18 Chain Bearing-outer | 88 Washer |
| 20 Knife fastener | 89 Tensioner Assembly |
| 22 Locknut | 90 Anchor plate |
| 24 Office | 92 Tension rod orifice |
| 25 Orifice | 94 Orifice |
| 26 Orifice | 96 Pivot plate |

-continued

Reference Numerals in Drawings

| PART NAME | PART NAME |
|---|---|
| 28 Stationary guard | 98 Shaft weldment |
| 29 Channel | 100 Orifices |
| 30 Slot | 102 Washer |
| 31 Drive assembly | 104 Locknut |
| 32 Bracket | 106 Tension rod |
| 34 Hydraulic motor | 108 Coil spring |
| 36 Coupling | 110 Washer |
| 38 Rectangular channel | 112 Adjusting nut |
| 40 Shaft | 114 Pivot arm orifice |
| 42 Incurvate channel | 116 Washer |
| 44 Bearing | 118 Pin |
| 45 Slip Clutch Assembly | 120 Pivot arm |
| 46 Drive hub | 122 Orifice-pivot |
| 48 Cylindrical recess | 124 Threaded orifice |
| 50 screw | 126 Pivot arm orifice |
| 52 Nut | 128 Bolt |
| 54 Threaded orifice | 130 Locknut |
| 56 Key | 131 Tensioner pulley assembly |
| 58 Rectagular channel | 132 Guide plate |
| 60 Grease fitting | 134 Center disk |
| 62 Treaded orifice | 136 Bolted fasteners |
| 63 Pilot Shaft | 138 Locknut |
| 64 Bore | 139 Orifice |
| 65 Clutch Plate-Upper | 140 Bearing |
| 66 Clutch plate-Lower | 141 Orifice |
| 67 Orifice | 142 Bolted fasteners |
| 68 Drive pin | 144 Return Channel |
| 69 Drive Pulley assembly | 146 Orifices |
| 70 Upper guide plate | 148 Polyethylene Bearing Surface |
| 71 Pilot Bearing | |

DETAILED DESCRIPTION OF THE PREFERRED EMBODIMENT

Figure 2:
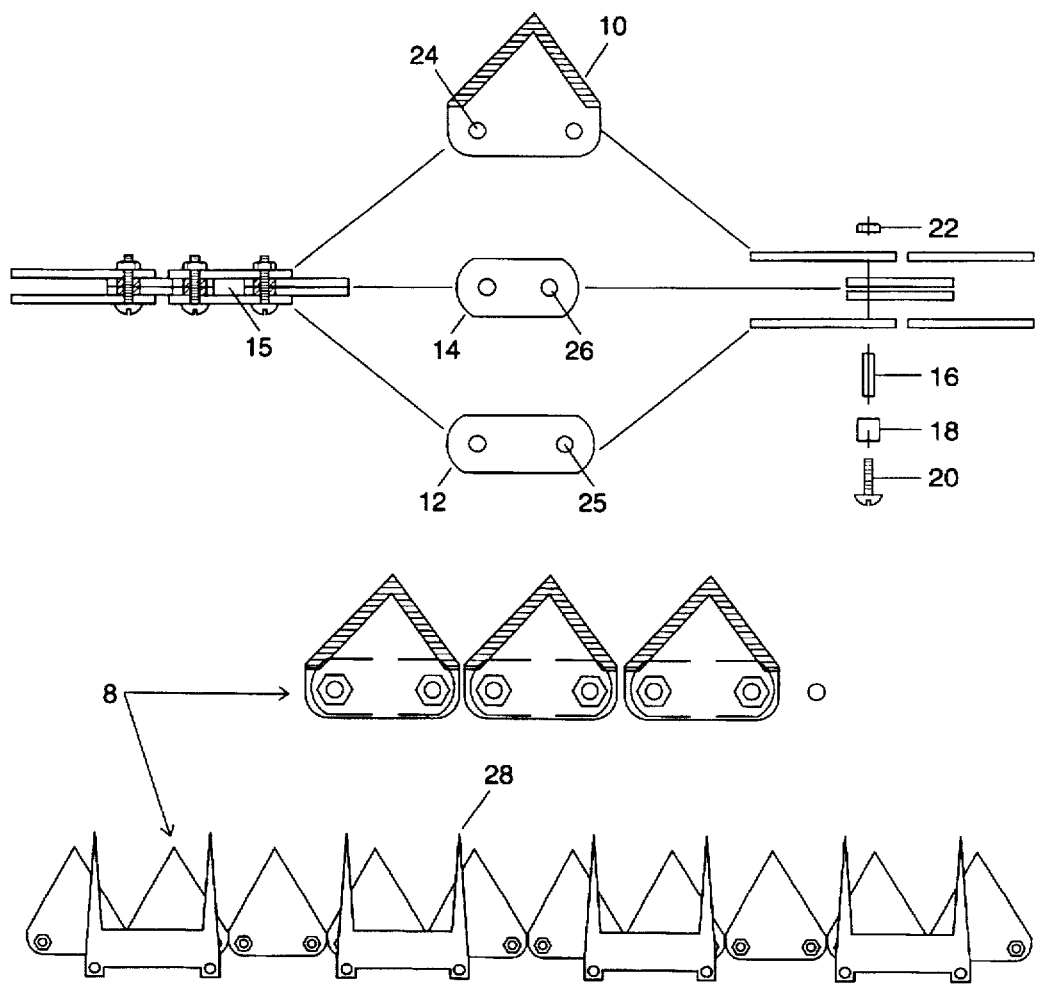
FIG. 2 is an exploded view of the chain detail.

Referring to FIG. 1, there is shown generally at 8, a sickle chain assembly according to the present invention which is installed on an existing combine elongated platform 7. As shown by the direction of the arrows, the knives 10 are translated following the channel formed by a plurality of stationary guards 28, which are fastened along the front of an existing main cutter support 9 engaging a drive assembly 31, along one side, engaging a tensioner assembly 89, along the rearward side enclosed in the return channel 144 which is lined with a polyethylene bearing surface 148, engaging a second tensioner assembly 89, along the other side, engaging a drive assembly 31 eventually returning to the starting point in a continuous motion. The direction of the arrows shown in FIG. 1 is illustrative only, since one feature of the present invention is the ability to reverse the direction of travel of the blades at will. As best viewed in FIG. 2, the sickle chain assembly 8 is comprised of knives 10, chain members 12, alternating link members 14, chain bearing members 16 and 18, knife fasteners 20,and locknuts 22. Knives 10 are typically the same as those in use on standard reciprocating units with the exception of the rounded rearward corners, to allow for the desired rotation around the drive and tensioner units. Chain members 12 are elongated rectangles possessing rounded ends constructed of hardened flat metal and have two orifices 25, which are spaced identically to the knife orifices 24. Links 14, which are elongated rectangles possessing rounded ends with orifices 26 and constructed of hardened flat metal, connect the knife 10 and chain member 12 to the next knife/chain segment. The width of the Chain member 12 and the link 14 are identical and will be the same width as the reciprocating bar which it will replace.

In order to form a continuous chain comprised of alternating Knives 10, chain members 12, and link members 14, a hardened bolted knife fastener 20 is used. The knife fastener 20 will pass through the chain member 12, then through the inner chain bearing 16, which will be press fitted into the chain member, through the knife section 10, and secured with a locknut 20. Two links 14 will be used together with a common outer chain bearing 18 press fitted into orifices 28 on each end of the links. The outer chain bearing 18 will fit over the inner chain bearing 16 between the knife 10 and chain member 12.

Figure 4:
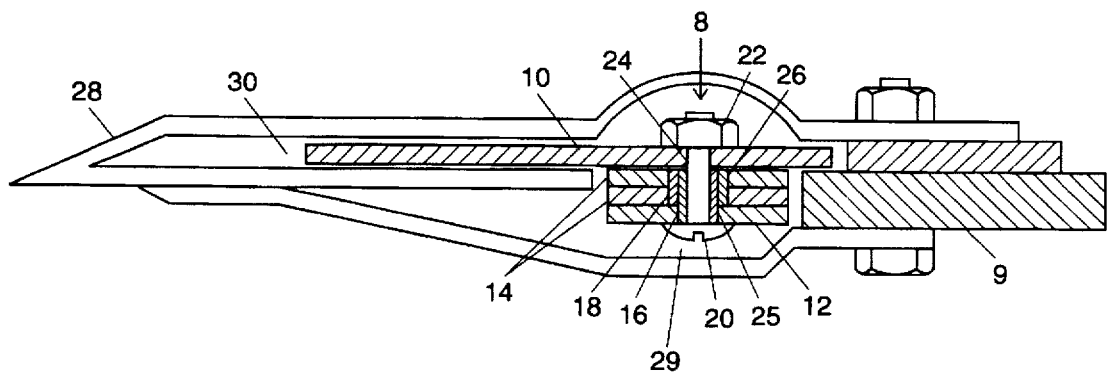
FIG. 4 is a sectional view taken along lines A—A of FIG. 1 showing an elevational view of the present invention as shown in FIG. 1.

As best viewed in FIG. 4, the sickle chain assembly 8 is prevented from leaving the confines of channel 29 by stationary guards 28, which are anchored to an existing main cutter support 9. Stationary guards 28 contain a slot 30 which permits the knife 10 to pass through the stationary guard 28 during translational movement of the knife 10, severing the crop stems, grass, etc. by the slicing action between the knife 10 and stationary guard slot 30. In operation the sickle chain assembly 8, moves in a direction substantially parallel to the main cutter support 9 in a continuous motion as illustrated in FIG. 1.

As best viewed in FIG. 1, the sickle chain assembly 8 is propelled by two drive assemblies 31 using hydraulic motors powered by a combine, or other parent power sources hydraulic system.

Figure 3:
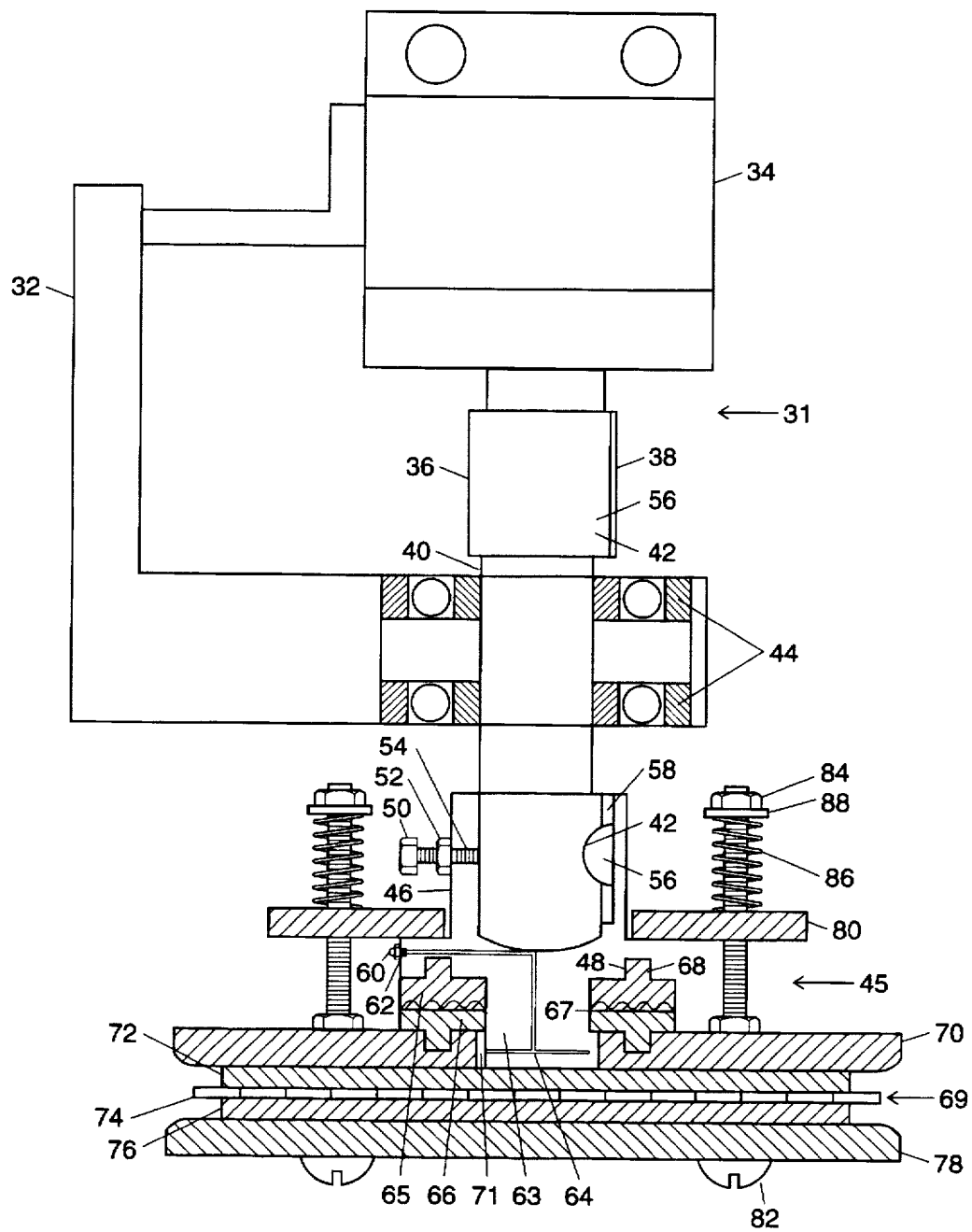
FIG. 3 is a sectional view of one of the drive assemblies, as depicted in FIG. 1.

As best viewed in FIG. 3, is the drive assembly 31. A hydraulic motor 34 is fastened to a mounting bracket 32. Power is transmitted from the hydraulic motor 34 to a rounded shaft 40, using a cylindrical coupling 36. The coupling possesses a rectangular channel 38 on the interior length of the cylinder to engage a semi-circular shaped, flat steel key 56 which fits into an incurvate channel 42 in the top end of the shaft 40. The shaft 40, is secured to the mounting bracket 32 by two sealed ball bearings 44, which provide stability and rotable antifriction for a slip clutch assembly 45 and a drive pulley assembly 69.

The bottom end of the shaft 40 possesses an incurvate channel 42 which secures it to a rectangular channel 58 of drive hub 46 using a semi-circular shaped flat steel key 56. A screw 50 with a locking nut 52 is inserted into a threaded orifice 54 of the drive hub 46 to provide a positive locking action of the drive hub 46 to the shaft 40. Power is transferred from the drive hub 46 to the drive pulley assembly 69 using a slip clutch assembly 45 protecting the chain sickle assembly 8 from damage when encountering obstructions.

The slip clutch assembly 45 consists of two planar serrated clutch plates 65 and 66 possessing a central orifice 67, to allow for the passage of a clutch pilot shaft, which is an integral part of the drive hub 46. The planar serrated clutch plates 65 and 66 are sandwiched between the drive hub 46 and upper guide plate 70, and are provided with drive pins 68 on the side opposite of the planar serrations which engage cylindrical recesses 48 in the drive hub 46 for the upper clutch plate 65, and cylindrical recesses 48 in the upper guide plate 70 for the lower clutch plate 66. This provides for positive engagement of power to the drive pulley assembly 69 by means of the slip clutch assembly 45. The slip clutch assembly 45 is held under spring pressure supplied by coiled clutch springs 86, which fit slidably over clutch bolts 82 which pass through the drive pulley assembly 69 upward through a pressure plate 80 and secured and adjusted by washers 88 and nuts 84.

When an obstacle is encountered, causing excessive force, the serrations of the clutch plates overcome the spring pressure forcing the upper clutch plate 65, drive hub 46, and pressure plate 80 upward allowing the serrations to slip over one another protecting the sickle chain assembly until the operator stops the hydraulic motors 34, and removes the obstruction.

The slip clutch assembly 45 is protected from friction, and secured in position while slipping, by the use of a clutch pilot shaft 63 on the drive hub 46, and a clutch pilot bearing 71 affixed into the upper guide plate 70. The drive hub 46 has bores 64 for grease passage to the clutch pilot shaft 63, which are supplied with grease by a grease fitting 60 fitted into a threaded orifice 62.

As best viewed in FIG. 3, is a drive pulley assembly 69 comprised of a thin hardened metal sprocket 74 sandwiched between upper drive disk 72 and lower drive disk 76, then sandwiched between upper guide plate 70 and lower guide plate 78. The upper guide plate 70 and lower guide plate 78 are thick steel disks with bevelled edges on one side whose purpose is to keep the sickle chain assembly aligned onto the sprocket 74 and drive disks 72 and 76. The sprocket 74 has teeth around its perimeter which engage the sprocket slot 15 formed by the construction of the sickle chain assembly, as best viewed in FIG. 2. The purpose of the drive sprocket is primarily to keep the sickle chain assembly 8 in alignment, and secondly to provide a portion of power transfer to the sickle chain assembly 8. The upper drive disc 72 and lower drive disc 76 are disc shaped thick hard rubber or other hard resilient material. The drive discs 72 and 76 main purpose is the transfer of power from the hydraulic motor 34 to the sickle chain assembly 8. This method of power transfer eliminates much wear on the chain, and provides smooth transfer around the drive pulley assemblies 69.

Figure 5:
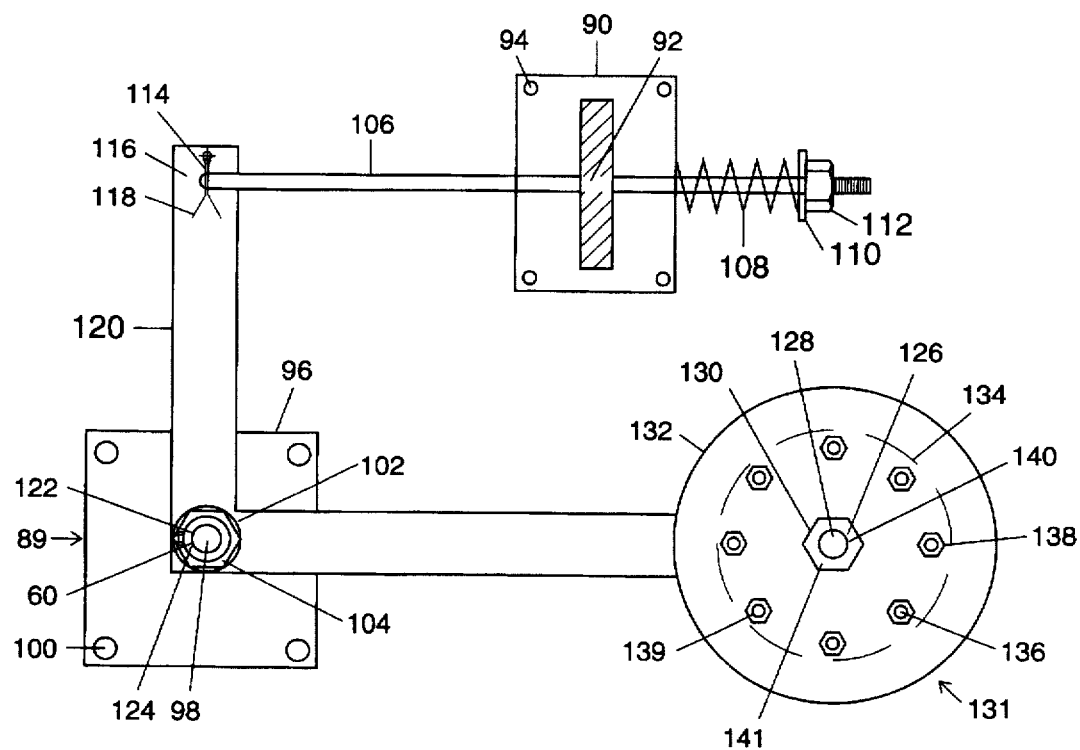
FIG. 5 is a top view of the tensioner assembly according to FIG. 1.

As best viewed in FIG. 5, is a tensioner assembly 89. This unit consists of a tensioner pulley assembly 131 constructed in a similar manner as the drive pulley assemblies 69, in that it incorporates a center disc 134, made of hard rubber or other hard resilient material, sandwiched between two guide plates 132 which are made of thick disc shaped steel. The guide plates have centrally located orifices 141 to accept ball bearings 140, through which will pass the bolt 128 which secures the tensioner pulley to the pivot arm orifice 126. The guide plates also have eight orifices 139 through which will pass the bolted fasteners 136 to secure the guide plates 132 and the center disc 134 together along with locknuts 138. Bevelled edges are incorporated on one side of each of the guide plates 132 whose purpose is to keep the sickle chain assembly 8 aligned onto the pulley. The center disc 134 will bear all of the pressure the sickle chain assembly 8 exerts on the tensioner pulley assembly 131, cushioning the chain and preventing metal to metal wear. The tensioner pulley assembly 131 maintains constant tension on the sickle chain assembly 8 by being affixed to a L shaped pivot arm 120 constructed of thick steel mounted onto a pivot plate 96 which has a rounded steel shaft weldment 98 attached to it, allowing the pivot arm 120 to move rotably. The tensioner assembly exerts constant outward pressure on the sickle chain assembly 8 with the use of a tension rod 106 which connects to the pivot arm orifice 114 on one end. The tension rod 106 then passes through a tension rod orifice 92, which is bored into a flat rectangular plate which is welded at a right angle to another flat rectangular plate possessing mounting orifices 94 forming the anchor plate 90, then through a coil spring 108, and secured and adjusted with washer 110 and adjusting nut 112.

Figure 6:
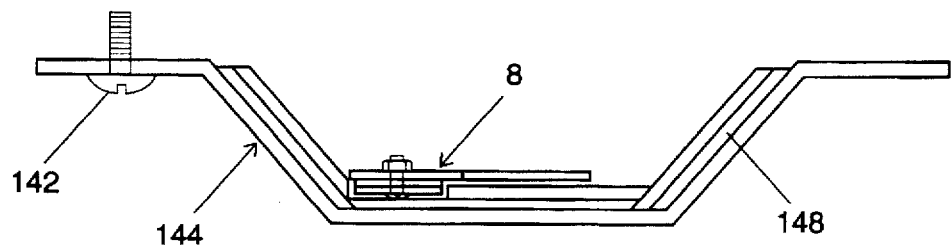
FIG. 6 is a sectional view of the return channel.
Figure 7:
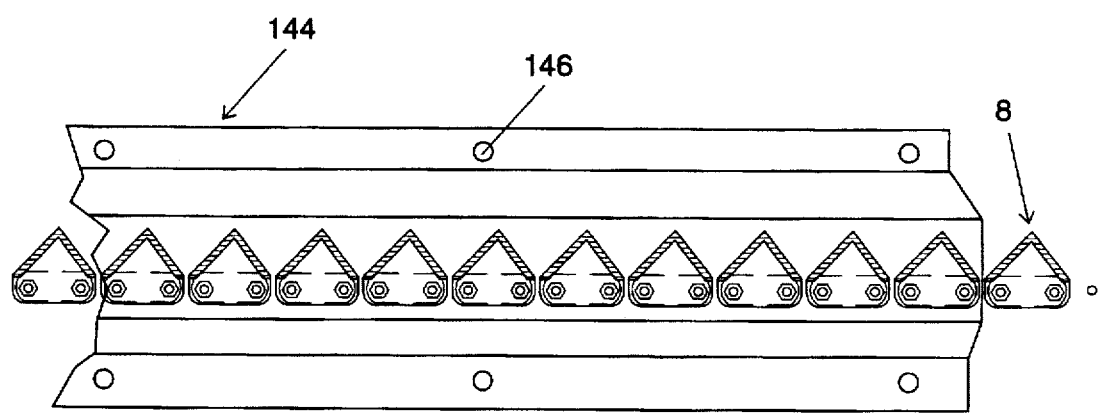
FIG. 7 is a side view of the return channel.

As best viewed in FIG. 6 and FIG. 7, a return channel 144 constructed of thin metal formed into a flat bottomed V shape with mounting flanges and lined with a polyethylene bearing surface 148, is mounted lengthwise along the rearward bottom side of the cutting unit as best seen in FIG. 1, using bolted fasteners 142, to secure the return channel intermittently as needed to the to the cutting unit.

SUMMARY, RAMIFICATIONS, AND SCOPE

Accordingly, the reader will see that the chain sickle cutter of this invention overcomes some of the disadvantages of the prior art in that it can be retrofitted to existing cutting and harvesting machines and also may be used for new production models, utilizing a lightweight and durable design. Furthermore, the chain sickle cutter has the additional advantages in that it is comprised of a continuous chain which causes knives, which are an integral part of the chain, to continuously translate around an elongated frame member. The knives perform their cutting action throughout the entire length of travel along the front side of the frame member. The chain sickle according to the present invention may be constructed of readily available materials. Many of the components needed for the use of the present invention, are already affixed to the existing reciprocating unit, substantially reducing the cost. One novel aspect of the present invention resides in the unique shape of the cutting knife, being rearwardly rounded to allow the transit of the chain assembly around the drive assemblies and tensioner assemblies without the creation of any gaps. Also, the cutting knife forms the easily replaceable top link of the chain assembly, keeping the unit lightweight, compact, and able to fit into existing reciprocating knife units with only minor if any alteration, yet retaining strength.

The unique drive units located frontally at each end, incorporate a protective slip clutch assembly to protect the chain if a foreign object is encountered. The use of hard rubber or resilient disks on each side of a steel drive sprocket, situated between steel guide plates will prevent a substantial amount of wear due to metal to metal contact.

A light guage metal return channel lined with a polyethylene type bearing surface, will guide the chain/knife assembly on the rearward travel, enclosing the chain assembly for safety, and providing a virtually wear free and lightweight unit. The return channel design, allows placement on any existing cutting unit, located wherever is most favorable for ground clearance.

Spring loaded chain tensioners located at each rearward corner of the existing cutting unit, eliminate frequent adjustment and keep the chain assembly at the proper tension at all times. The guide pulley of the rotable tensioner assembly incorporates two steel guide plate disks on either side of a hard rubber or resilient disk, again to reduce wear due to metal/metal contact and guiding the chain assembly. A hydraulic motor will power each of the frontally located drive assemblies. Providing power to both sides of the apparatus, will eliminate stress on the chain assembly, prevent chain slap, and ensure smooth operation in both directions of the chain assembly. These hydraulic motors will be powered by the hydraulic system of the parent power unit. Controls will be located on the parent power unit allowing the operator to adjust the speed of the cutting chain. Also, with modern harvesters, the motors can be connected to an automatic reel speed hydraulic control circuit, which adjusts the speed of the cutter chain in relation to the forward ground speed of the parent power unit, automatically. The operator also will be provided with controls to change the rotary direction of travel. This feature is especially useful in clearing any buildup of foreign matter. When the knife blades start to dull, the operator may reverse the rotational direction of travel, which exposes a new sharp cutting surfaces on the opposite side of the knives.

Although the description above contains many specifications, these should not be construed as limiting the scope of the invention, but as merely providing illustrations of some of the presently preferred embodiments of this invention. For example, the knives may have varying shapes such as a double tooth knife; the stationary guards may be those of various designs or manufacturers, etc.

Thus the scope of the invention should be determined by the appended claims and their legal equivalents, rather than by the examples given.

I claim:

1. A chain assembly for a cutting and mowing apparatus, comprising a plurality of chain members, a plurality of knife members, and a plurality of link members, wherein
   (a) each of said chain members is flat, elongated and substantially rectangular in shape with an orifice therethrough adjacent each end thereof,
   (b) each of said knife members is flat and is shaped in the form of a substantially triangular portion with two sharp cutting edges and a substantially rectangular portion, said rectangular portion being identical in shape to said chain member and having an orifice therethrough adjacent each end thereof for alignment with said orifices in one of said chain members,
   (c) each of said link members is substantially rectangular in shape and has an orifice therethrough adjacent each end thereof,
   (d) said chain members and knife members are positioned in pairs each consisting of a chain member and a knife member parallel to one another and spaced from one another with their respective orifices in alignment, and
   (e) adjacent pairs of said chain and knife members are linked to one another by one of said link members with one of its orifices in alignment with said orifices of one of said pairs and with the other of its said orifices in alignment with said orifices of an adjacent one of said pairs.

2. A chain assembly according to claim 1, including fastening means extending through each of said aligned orifices to fasten said chain member and said knife member in each of said pairs to each other.

3. A chain assembly according to claim 2 wherein said each of said fastening means is rotatable within said orifice of said link means.

4. A chain assembly according to claim 1 wherein each of said rectangular chain members, said rectangular portions of said knife members and each of said link members includes rounded corners.

5. A chain assembly according to claim 1 wherein said space between each of said chain members and said knife members paired therewith permits entry of a driving spoke to drive said chain by engagement with one of said link members.

6. A chain assembly according to claim 1 further including a platform for mounting said assembly on a movable land vehicle with said cutting edges substantially parallel to the plane of motion of said vehicle.

7. A chain assembly according to claim 1 wherein said chain members, knife members and link members are connected into an endless loop path.

8. A chain assembly according to claim 7 further including drive means for moving said chain in said endless loop path.

9. A chain assembly according to claim 8 wherein said drive means is reversible.

10. A chain assembly according to claim 8 including spring means for maintaining tension on said chain.

11. A cutting and mowing machine comprising a plurality of chain members, a plurality of knife members and a plurality of link members
    (a) each of said chain members is flat, elongated and substantially rectangular in shape with an orifice therethrough adjacent each end thereof,
    (b) each of said knife members is flat and is shaped in the form of a substantially triangular portion with two sharp cutting edges and a substantially rectangular portion, said rectangular portion being identical in shape to said chain member and having an orifice therethrough adjacent each end thereof for alignment with said orifices in one of said chain members.
    (c) each of said link members is substantially rectangular in shape and has an orifice therethrough adjacent each end thereof, and
    (d) said chain members and knife members are positioned in pairs each consisting of a chain member and a knife member parallel to one another and spaced from one another with their respective orifices in alignment,
    (e) adjacent pairs of said chain and knife members are linked to one another by one of said link members with one of its orifices in alignment with said orifices of one of said pairs and with the other of its said orifices in alignment with said orifices of an adjacent one of said pairs,
    (f) drive means for said chain assembly, including a slip clutch,
    (g) tensioning means for tensioning said loop, and
    (h) a channel for guiding said chain assembly.

* * * * *